(12) United States Patent
Hansen

(10) Patent No.: US 9,647,444 B2
(45) Date of Patent: May 9, 2017

(54) VARIABLE THRESHOLD CURRENT LIMITING CIRCUIT

(71) Applicant: Hamilton Sundstrand Corporation, Charlotte, NC (US)

(72) Inventor: Harold J. Hansen, Hamden, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 106 days.

(21) Appl. No.: 14/740,412

(22) Filed: Jun. 16, 2015

(65) Prior Publication Data

US 2016/0372910 A1    Dec. 22, 2016

(51) Int. Cl.

| H02H 3/00 | (2006.01) |
|---|---|
| H02H 3/08 | (2006.01) |
| H02H 7/08 | (2006.01) |
| H02P 29/032 | (2016.01) |
| H02H 9/02 | (2006.01) |

(52) U.S. Cl.
CPC ............ *H02H 3/08* (2013.01); *H02H 7/0833* (2013.01); *H02P 29/032* (2016.02); *H02H 9/02* (2013.01); *H02H 9/025* (2013.01)

(58) Field of Classification Search
USPC .................................... 361/86–87, 93.7–93.9
See application file for complete search history.

(56) References Cited

U.S. PATENT DOCUMENTS

| 4,839,570 | A | 6/1989 | Saganovsky |
| 5,473,495 | A | 12/1995 | Bauer |
| 5,528,721 | A | 6/1996 | Searcy, II et al. |
| 6,002,354 | A | 12/1999 | Itoh et al. |
| 6,170,241 | B1 | 1/2001 | Shibilski et al. |
| 6,659,783 | B2 | 12/2003 | Copper et al. |
| 6,731,082 | B2 | 5/2004 | Pelonis |
| 7,672,107 | B2 | 3/2010 | So |
| 8,270,138 | B2 * | 9/2012 | Takahashi ............ H03K 17/687 361/101 |
| 2003/0063900 | A1 | 4/2003 | Wang et al. |
| 2004/0105664 | A1 | 6/2004 | Ivankovic |
| 2013/0026825 | A1 * | 1/2013 | Savage ................... H02M 1/32 307/9.1 |

(Continued)

FOREIGN PATENT DOCUMENTS

| EP | 1111221 | 6/2001 |
| EP | 2770628 | 8/2014 |

OTHER PUBLICATIONS

European Search Report for Application No. 16174730.8 dated Oct. 10, 2016.

(Continued)

*Primary Examiner* — Danny Nguyen
(74) *Attorney, Agent, or Firm* — Carlson, Gaksey & Olds, P.C.

(57) ABSTRACT

A current limiting circuit for a motor controller includes a comparator. The comparator has a sensed current input, a current threshold input, and an overcurrent protection trip output. A variable resistance current threshold circuit is connected to the current threshold input. A first controller is connected to the variable resistance current threshold circuit via a plurality of connections. The first controller is configured to control a voltage output of the variable resistance current threshold circuit.

18 Claims, 2 Drawing Sheets

(56) References Cited

U.S. PATENT DOCUMENTS

2014/0177120 A1* 6/2014 Zhang ..................... H02H 3/08
361/93.9

OTHER PUBLICATIONS

Yuan, Jun, et al., A BIST scheme based on resistance match for current-mode R-2R ladder Digital-to-Analog Converter, Computer Research and Development (ICCRD), Mar. 11, 2011, 3rd International Conference on IEEE, pp. 305-309, Japan.

* cited by examiner

VARIABLE THRESHOLD CURRENT LIMITING CIRCUIT

TECHNICAL FIELD

The present disclosure relates generally to electronics for utilization in a spacecraft, and more specifically to a current limiting circuit for the same.

BACKGROUND

Motor controller circuits frequently includes current limiters that are configured to monitor a current in the motor controller and disable or reduce the current when the current exceeds an overcurrent threshold. Such circuits protect the controller, the motor, and the overall system from excessive current that can occur during operation. The specific electrical system for any given application requires a current limit tailored to that specific application, as the amount of current that can be passed through a system without damaging the system varies depending on the specifications of the system itself.

When utilized in spacecraft, and similar applications, every element of the system including the motor controller must undergo a qualifications process to determine if it is capable of operating in conditions present outside of the Earth's atmosphere. Further, any time a component is altered within a system for spacecraft, or similar application, the entire system must be re-qualified. Requalifying a substantially similar motor controller when a current limit requirement is changed can add considerable expense to a project design.

SUMMARY OF THE INVENTION

Disclosed is a current limiting circuit for a motor controller including: a comparator having a sensed current input, a current threshold input, and an overcurrent protection trip output, a variable resistance current threshold circuit connected to the current threshold input, and a first controller connected to the variable resistance current threshold circuit via a plurality of connections, the first controller being configured to control a voltage output of the variable resistance current threshold circuit.

Also disclosed is a method for providing current limiting to a motor controller including: providing a sensed current to a comparator, generating a current threshold using a variable resistance resistor network, and providing the current threshold to the comparator, and comparing the sensed current to the current threshold and outputting a trip signal from the comparator when the sensed current exceeds the current threshold.

Also disclosed is a motor controller for a spacecraft including: a current limiting circuit including a comparator having a sensed current input, a current threshold input, and an overprotection trip output, and a variable resistance resistor network having a plurality sections of equivalent resistors, an output of the variable resistance network being connected to the current threshold input, and a programmable controller having a plurality of pin connections, each of the plurality of pin connections connected to a distinct node within the variable resistance resistor network, and each of the plurality of pin connections being operable to provide one of a zero volt output and a positive voltage output.

These and other features of the present invention can be best understood from the following specification and drawings, the following of which is a brief description.

DETAILED DESCRIPTION OF AN EMBODIMENT

Current limiter circuits in motor controllers protect the controller, the motor, and the overall system from excessive current in the event of an overcurrent. Such an overcurrent can arise due to abnormal operations, start-up conditions, failures within the system, or for any similar reason. Each system requires that the particular current limiter circuit be custom tailored to meet the operational parameters and fault protection schemes for that specific system. As a result, traditional current limiter circuits are application specific.

With regard to spacecraft, and similar applications, each circuit element is further subjected to a substantial qualifications process to ensure that the element or component is sufficiently operable in extreme conditions, such as those present outside of the Earth's atmosphere. Any change in the design of the system requires the entire system to be re-qualified.

Current limiting circuits for spacecraft, are constructed using analog circuits and circuit elements. Existing analog current limit circuits for digital motor controller designs, however, impose a fixed current limit on the motor controller. The fixed current limit is achieved through the utilization of a fixed voltage divider providing a voltage threshold. Once the circuit is built, and installed, there is no way to alter the current limiting threshold provided by the fixed voltage divider. In certain implementations, however, it is desirable to temporarily allow the current threshold established by the current limiting circuit to be exceeded without entirely disabling current threshold protection.

Spacecraft applications are single or low production applications, meaning that only a single system, or a very limited number of systems, requiring a given current limit circuit will ever be built. As a result of the low production numbers, and the high cost of requalifying each component for a new spacecraft, application specific current limit circuits are expensive to produce. However, general current limiter circuits utilizing a digital controller to compare a sensed current value against a threshold, as are known in the art, are unsuitable for some spacecraft applications.

Figure 1:
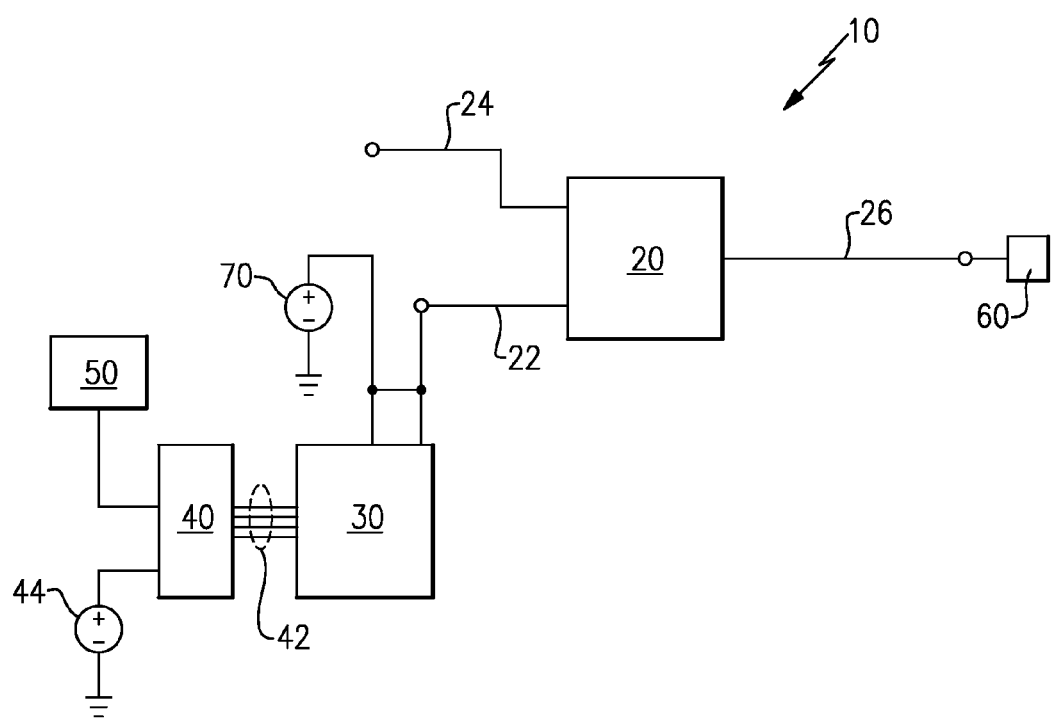
FIG. 1 schematically illustrates an exemplary programmable current limiting circuit for a motor controller.

FIG. 1 schematically illustrates an exemplary programmable current limiting circuit 10, capable of generating a variable current limiting threshold. The current limiting threshold generated by the programmable current limiting circuit 10 can be adjusted by a controller during operation without altering or replacing any of the analog current limiter circuit elements.

The programmable current limiting circuit 10 includes a comparator 20 having a current threshold input 22 and a current sense input 24. The comparator 20 compares a voltage input received on the current sense input 24 against a voltage input received on the current threshold input 22 and outputs "high" (a positive voltage) on a comparator output 26 when the current sense input 24 exceeds the current threshold input 22. The output of the comparator 20 is provided to a current trip circuit 60 within the motor controller containing the current limit circuit 10. When the output of the comparator 20 is high, the current trip circuit 60 trips, and an overcurrent condition is prevented. Any known current trip circuit 60 can be utilized in conjunction with the system described herein. In the illustrated example, the current sense input 24 is a voltage value representative of a sensed current within the motor controller, and the current threshold input 22 is a voltage value representative of a current threshold.

Connected to the current threshold input 22 of the comparator 20 is a resistor network 30 configured to provide a voltage to the current threshold input 22. The resistor network 30 is connected to a programmable controller 40 via multiple pin connections 42. Each of the multiple pin connections 42 can be set to output either zero volts or a positive voltage by the programmable controller 40. Each of the multiple pin connections 42 is connected to the resistor network 30 at different locations within the resistor network 30. The voltage output of the resistor network 30 is determined by which of the multiple pin connections 42 has a positive voltage at a given time. In this way, the programmable controller 40 can set, and alter, the current threshold for the current limiter circuit 10 by altering which of the pin connections 42 are outputting a positive voltage.

In some examples the programmable controller 40 is a Field Programmable Gate Array (FPGA) controller. In alternative examples, any other type of programmable controller qualified for utilization in spacecraft can be utilized to the same effect. In yet further examples, the programmable controller 40 is a control element having excess pin outputs within an existing motor controller.

By altering which pin connections 42 output a positive voltage, the total voltage seen by the current threshold input 22 is controlled by the programmable controller 40, and the current limit threshold can be adjusted. In this way, the controller can adjust the current limit during operations in order to temporarily override or alter the default overcurrent threshold. Utilization of the programmable controller 40 further allows a single circuit arrangement, such as the illustrated circuit 10, to be utilized on a common circuit board and included within multiple distinct spacecraft, thereby reducing the costs associated with developing and qualifying a distinct current limiting circuit for each spacecraft.

While illustrated herein as including four pin connections 42 for simplicity, it is understood that existing controllers 40, such as FPGA's, can include significantly more available pin connections 42. Each additional pin connection 42 between the programmable controller 40 and the resistor network 30 increases the number of possible voltage thresholds and decreases a voltage difference between each possible threshold and the next possible threshold. Increasing the additional possible voltage thresholds is referred to as increasing the voltage resolution of the overvoltage threshold.

In some examples, such as the illustrated example of FIG. 1, the variable voltage set by the programmable controller 40 is controlled by a controller 50, distinct from the motor controller. In alternative examples the programmable controller 40 is incorporated into the motor controller, and the motor controller can control the outputs of each of the pin connections 42. A voltage source 44 is connected to, and powers, the programmable controller 40. Similarly, a voltage source 70 is connected at the output of the resistor network 30 and operates in conjunction with the voltage provided by the resistor network 30 to provide the desired current threshold to the current threshold input 22. In alternative examples, a single voltage source can be connected in place of the illustrated two voltage sources 44, 70.

Figure 2:
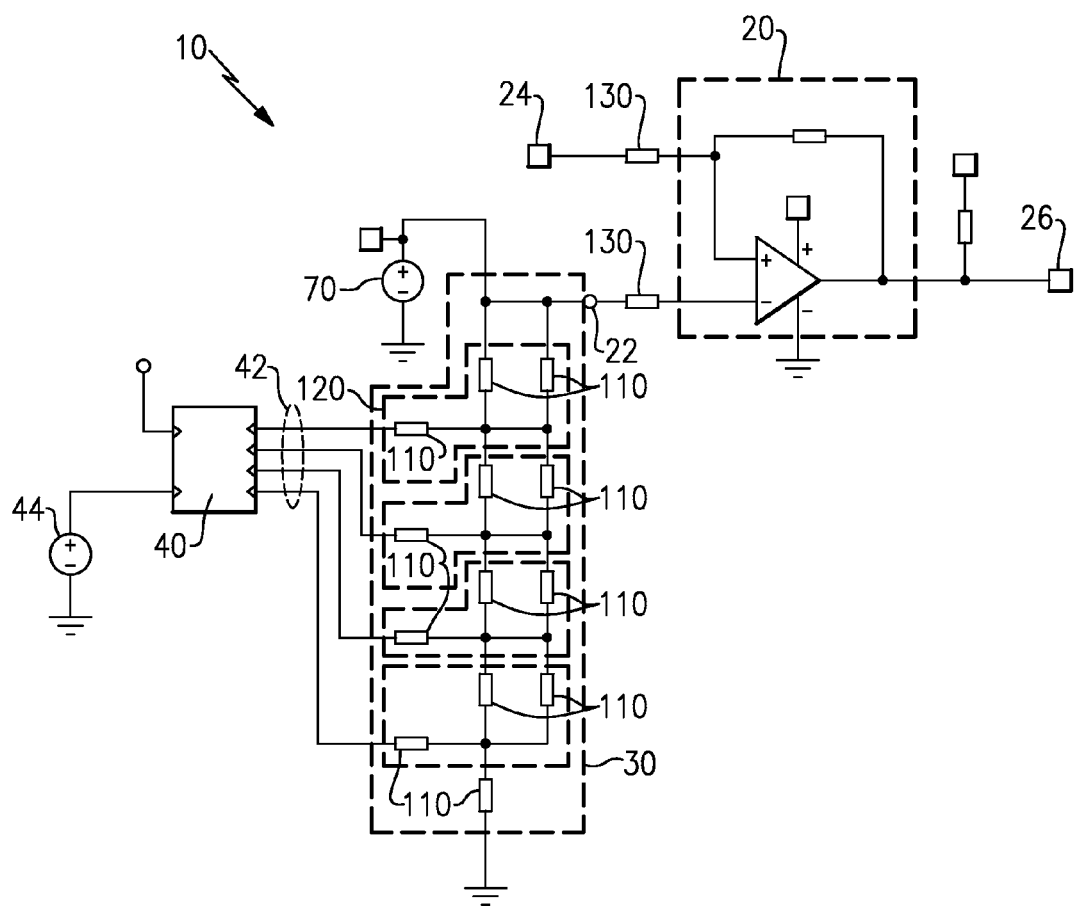
FIG. 2 schematically illustrates a detailed example implementation of the exemplary programmable current limiting circuit of FIG. 1.

With continued reference to FIG. 1, and with like numerals indicating like elements, FIG. 2 schematically illustrates a detailed example implementation of the exemplary programmable current limiting circuit 10 illustrated in FIG. 1. In the example of FIG. 2, the resistor network 30 is an equal value resistance ladder network having multiple resistance sections 120, or rungs. The sections 120 are arranged in series with each other. Each section 120 of the resistance ladder is connected to a distinct pin connection 42. The sections 120 include multiple resistors 110, with each of the resistors 110 having the same resistance value as each other of the resistors 110 within the resistor network 30, within manufacturing tolerances.

By utilizing approximately identical resistors 110 within the resistor network 30, only a single type of resistor needs to undergo the spacecraft qualification process, and all resistors 110 utilized within the resistor network 30 can be sourced from a single resistor batch. The illustrated resistor network 30 includes four sections 120, alternative examples can include any number of sections 120 In some examples, the single type of resistor 110 can be resistors 110 of equivalent values, but sourced from any number of sources. Resistors of the same resistance, within manufacturing tolerances, are referred to herein as equivalent. In alternative examples, all the resistors 110 utilized to create the resistor network 30 originate from a single resistor batch. In both examples, the resistors 110 have approximately identical resistance values, within manufacturing tolerances.

In a practical implementation, each of the pin connections 42 can be set to output either 0 volts or a positive voltage by the controller 50. In one example, the positive output voltage of the pin connections 42 is 5 volts. By setting the voltage of any given pin connection 42 to a positive voltage, the programmable controller 40 provides a voltage to the corresponding section 120 of the resistance ladder in the resistor network 30. The voltages then promulgate through the resistor network 30 which acts as a voltage divider in conjunction with the connected voltage source 70. The output of the resistor network 30 is provided to the current threshold input 22, and sets the overcurrent threshold of the comparator 20.

Further connecting each of the current threshold input 22 and the current sense input 24 to the comparator 20 are a pair of conditioning resistors 130. In some examples, the conditioning resistors 130 can be equivalent to the resistors 110 in the resistor network 30. In alternative examples, the conditioning resistors 130 can be any other resistance, and are not equivalent.

In yet a further example, the above described current limiter is incorporated into a common "current limiter" circuit board. The common current limiter circuit board can be utilized in multiple different spacecraft, without requiring the re-design or re-qualification of the current limiter circuit. By way of example, the resistor network 30 and the comparator 20 could be incorporated on a single circuit board and connected to an existing programmable controller within a spacecraft. The resolution of the variable resistor network 30 is dependent on the number of available pin connections 42 from the existing programmable controller, and the existing programmable controller can be programmed to apply any desired voltage threshold within the resistance resolution of the variable resistor network 30.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A current limiting circuit for a motor controller comprising:
   a comparator having a sensed current input, a current threshold input, and an overcurrent protection trip output;
   a variable resistance current threshold circuit connected to the current threshold input, the variable resistance current threshold circuit including a plurality of stages, each of said stages including multiple resistors; and
   a first controller connected to the variable resistance current threshold circuit via a plurality of connections, the first controller being configured to control a voltage output of said variable resistance current threshold circuit.

2. The current limiting circuit of claim 1, wherein the variable resistance current threshold circuit is a resistor ladder circuit.

3. A current limiting circuit for a motor controller comprising:
   a comparator having a sensed current input, a current threshold input, and an overcurrent protection trip output;
   a variable resistance current threshold circuit connected to the current threshold input, wherein the variable resistance current threshold circuit is a resistor ladder circuit including a plurality of identical sections connected in series, each of said sections being connected to one of a plurality of connections to a first controller; and
   the first controller being configured to control a voltage output of said variable resistance current threshold circuit.

4. The current limiting circuit of claim 3, wherein each of said sections includes a plurality of resistors.

5. The current limiting circuit of claim 3, wherein each resistor in the resistor ladder circuit is equivalent.

6. The current limiting circuit of claim 5, wherein each resistor in the resistor ladder circuit originates from a single batch.

7. A current limiting circuit for a motor controller comprising:
   a comparator having a sensed current input, a current threshold input, and an overcurrent protection trip output;
   a variable resistance current threshold circuit connected to the current threshold input, wherein the variable resistance current threshold circuit comprises a resistor ladder circuit and each resistor in said resistor ladder circuit is equivalent;
   a first controller connected to the variable resistance current threshold circuit via a plurality of connections, the first controller being configured to control a voltage output of said variable resistance current threshold circuit; and
   said comparator further including a first conditioning resistor connecting said sensed current input to said comparator and a second conditioning resistor connecting said current threshold input to said comparator, the first and second conditioning resistors being equivalent with each resistor in the resistor ladder circuit.

8. The current limiting circuit of claim 3, wherein said first controller is a programmable controller.

9. The current limiting circuit of claim 3, wherein said first controller is a field programmable gate array.

10. The current limiting circuit of claim 3, wherein said first controller is a control element for a spacecraft motor controller.

11. The current limiting circuit of claim 10, wherein said plurality of connections are controller pin connections.

12. A method for providing current limiting to a motor controller comprising:
   providing a sensed current to a comparator;
   generating a current threshold using a variable resistance resistor network, and providing the current threshold to the comparator;
   comparing the sensed current to the current threshold and outputting a trip signal from the comparator when the sensed current exceeds the current threshold; and
   altering the current threshold in response to a controller command by at least altering an output on at least one of a plurality of pin connections between the controller and the variable resistance resistor network, wherein altering the output on at least one of the plurality of pin connections comprises one of altering an output from 0 volts to a positive voltage and altering an output from a positive voltage to 0 volts, and wherein altering the output of at least one of the plurality of pin connections alters a voltage output of the resistor network.

13. The method of claim 12, wherein generating the current threshold using the variable resistance resistor network comprises providing a positive voltage to at least one section of a resistor network.

14. The method of claim 13, wherein each section of the resistor network has an identical configuration and all resistors in said resistor network are equivalent resistors.

15. The method of claim 12, wherein the sensed current is a voltage representative of an actual sensed current and wherein the current threshold is a voltage output of the variable resistance network.

16. A motor controller for a spacecraft comprising:
   a current limiting circuit including a comparator having a sensed current input, a current threshold input, and an overprotection trip output, and a variable resistance resistor network configured as a resistor ladder having a plurality of identical sections of equivalent resistors connected in series, an output of the variable resistance network being connected to the current threshold input; and
   a programmable controller having a plurality of pin connections, each of said plurality of pin connections connected to a distinct node within said variable resistance resistor network, each distinct node corresponding to one of said plurality of identical sections of equivalent resistors, and each of said plurality of pin connections being operable to provide one of a zero volt output and a positive voltage output.

17. The motor controller of claim 16, wherein each resistor in said variable resistance resistor network is approximately identical to each other resistor in said variable resistance resistor network.

18. The current limiting circuit for a motor controller of claim 1, wherein each of said stages is arranged as a voltage divider circuit.

* * * * *